(12) United States Patent
Wisnewski et al.

(10) Patent No.: US 9,276,645 B2
(45) Date of Patent: Mar. 1, 2016

(54) INDUCTIVE CHARGER FOR PROVIDING RADIO FREQUENCY ("RF") SIGNAL TO A PORTABLE ELECTRIC DEVICE

(75) Inventors: Mark A. Wisnewski, Stockbridge, MI (US); David J. Trzcinski, Howell, MI (US); Gregg R. Kittinger, Pontiac, MI (US); Donald B. Hibbard, Jr., Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 695 days.

(21) Appl. No.: 13/433,725

(22) Filed: Mar. 29, 2012

(65) Prior Publication Data
US 2013/0260842 A1    Oct. 3, 2013

(51) Int. Cl.
| H04M 1/00 | (2006.01) |
| H04B 5/00 | (2006.01) |
| H01F 38/14 | (2006.01) |
| H02J 5/00 | (2006.01) |
| H02J 7/02 | (2006.01) |
| H01Q 1/32 | (2006.01) |

(52) U.S. Cl.
CPC .............. *H04B 5/0093* (2013.01); *H01F 38/14* (2013.01); *H01Q 1/3275* (2013.01); *H02J 5/005* (2013.01); *H02J 7/025* (2013.01); *H04B 5/0037* (2013.01); *H04B 5/0075* (2013.01)

(58) Field of Classification Search
USPC ............................ 320/107–110, 137; 455/573
See application file for complete search history.

(56) References Cited

U.S. PATENT DOCUMENTS

| 7,521,890 B2 * | 4/2009 | Lee et al. ....................... 320/108 |
| 8,686,685 B2 * | 4/2014 | Moshfeghi .................... 320/108 |
| 2013/0200717 A1 * | 8/2013 | Bourilkov et al. ............ 307/104 |
| 2013/0214742 A1 * | 8/2013 | Vorenkamp et al. .......... 320/137 |

FOREIGN PATENT DOCUMENTS

| CN | 102318213 A | 1/2012 |
| EP | 0718908 A1 * | 12/1994 |
| KR | 20060012476 | 2/2006 |

OTHER PUBLICATIONS

Office Action Report Letter dated Nov. 21, 2014 for Chinese Patent Application No. 201310104122.0; First Office Action issued on Oct. 30, 2014; 2 pgs.

* cited by examiner

*Primary Examiner* — Christopher M Brandt
*Assistant Examiner* — Natasha Cosme
(74) *Attorney, Agent, or Firm* — Cantor Colburn LLP

(57) ABSTRACT

An inductive charger for a portable electronic device is provided. The portable electronic device has a radio frequency ("RF") antenna configured for receiving an outgoing RF signal, as well as a secondary coil. The inductive charger includes a primary coil configured for creating a magnetic flux. The magnetic flux is configured for coupling to the secondary coil in the portable electronic device to induce current. The inductive charger includes RF coupling assembly that receives an incoming RF signal. The RF coupling assembly is configured to radiate the outgoing RF signal that is based on the incoming RF signal. The inductive charger includes a radiator configured to receive the outgoing RF signal from the RF coupling assembly. The radiator is configured to radiate the outgoing RF signal to the RF antenna of the portable electronic device.

16 Claims, 2 Drawing Sheets

INDUCTIVE CHARGER FOR PROVIDING RADIO FREQUENCY ("RF") SIGNAL TO A PORTABLE ELECTRIC DEVICE

FIELD OF THE INVENTION

Exemplary embodiments of the invention relate to an inductive charger for a portable electronic device and, more particularly, to an inductive charger for providing an outgoing radio frequency ("RF") signal to a portable electronic device.

BACKGROUND

Portable electronic devices such as, for example, cellular telephones and smartphones may use rechargeable batteries to provide power to various components within the portable electronic device. In one approach to recharge the battery of the portable electronic device, an inductive charger is utilized. The inductive charger includes a primary coil, and the portable electronic device includes a secondary coil. When power is supplied to the inductive charger, current passes through the primary coil to create a magnetic flux. The portable electronic device is placed in proximity to the primary coil such that the magnetic flux couples to the secondary coil to induce current in the secondary coil. The secondary coil is connected to the battery, and the current induced in the secondary coil is used to charge the battery.

The inductive charger may be located within a vehicle. This provides a vehicle occupant with the opportunity to charge the battery of his or her portable electronic device while driving or riding in the vehicle. The location of the inductive charger within an interior cabin of the vehicle should be relatively convenient or easy to access by a driver and the other occupants of the vehicle. However, at least some of the locations within the interior cabin that are relatively accessible may not provide adequate radio frequency ("RF") reception. Thus, if a cellular telephone or smartphone is being charged, the location of the inductive charger may result in relatively low data rates, low quality audio reception and dropped calls. Accordingly, it is desirable to provide an inductive charger that may improve RF reception of the portable electronic device.

SUMMARY OF THE INVENTION

In one exemplary embodiment of the invention, an inductive charger for a portable electronic device is provided. The portable electronic device has a radio frequency ("RF") antenna configured for receiving an outgoing RF signal, as well as a secondary coil. The inductive charger includes a primary coil configured for creating a magnetic flux. The magnetic flux is configured for coupling to the secondary coil in the portable electronic device to induce current. The inductive charger includes RF coupling assembly that receives an incoming RF signal. The RF coupling assembly is configured to radiate the outgoing RF signal that is based on the incoming RF signal. The inductive charger includes a radiator configured to receive the outgoing RF signal from the RF coupling assembly. The radiator is configured to radiate the outgoing RF signal to the RF antenna of the portable electronic device.

In another exemplary embodiment of the invention, an inductive charger for a portable electronic device is provided. The portable electronic device has an RF antenna configured for receiving an outgoing RF signal and a secondary coil. The inductive charger includes a primary coil configured for creating a magnetic flux. The magnetic flux is configured for coupling to a secondary coil in the portable electronic device to induce current. The inductive charger includes a RF coupling assembly receiving an incoming RF signal and configured to radiate the outgoing RF signal that is based on the incoming RF signal. The inductive charger includes an RF element that is placed along the primary coil. The RF element is configured for receiving the outgoing RF signal from the RF coupling assembly and transmitting the outgoing RF signal to the RF antenna of the portable electronic device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
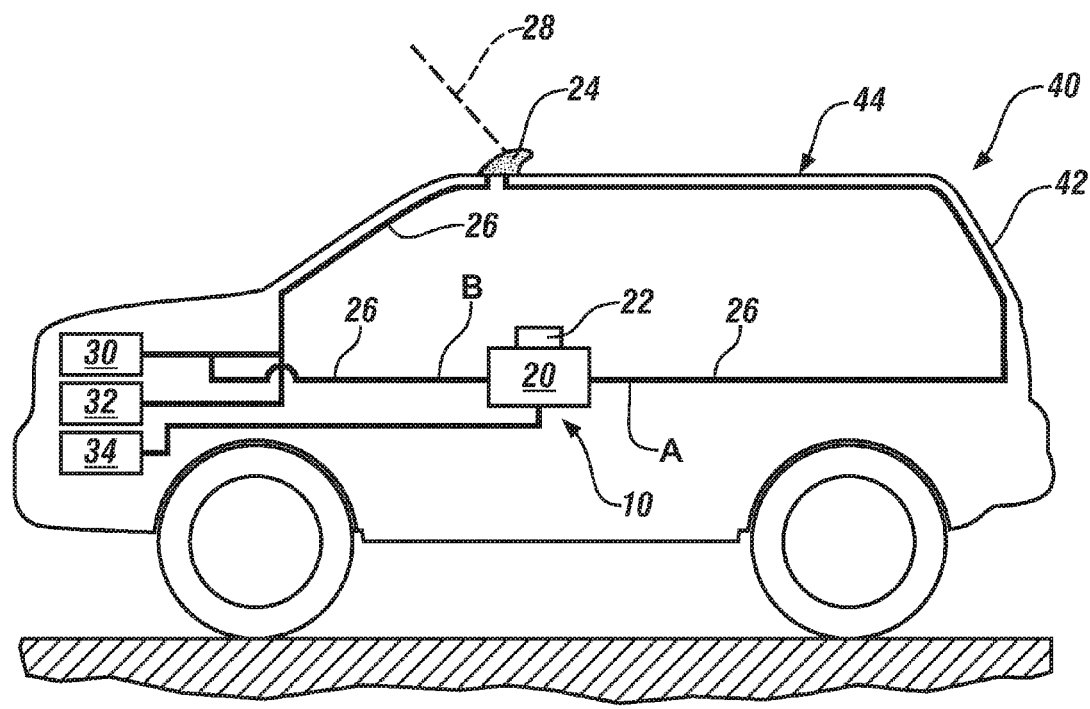
FIG. 1 is an exemplary schematic illustration of a charging system in a vehicle.

Referring now to FIG. 1, an exemplary embodiment is directed to a charging system 10 that also radiates a radio frequency ("RF") signal. The charging system 10 includes an inductive charger 20, a portable electronic device 22, an antenna 24, various data lines 26, a control module 30, a transceiver 32, and a battery 34. In the exemplary embodiment as shown in FIG. 1, the charging system 10 is employed in a vehicle 40. However, it is to be understood that the charging system 10 is not limited to a vehicle, and may be used in a variety of applications such as, for example an inductive charger used in a home or office.

The antenna 24 is configured to receive an incoming RF signal 28. The inductive charger 20 receives the incoming RF signal 28 from the antenna 24 through the data line 26. The data line 26 is any type of transmission line for carrying radio frequency signals such as, for example, a coaxial cable. In one exemplary approach, the incoming RF signal may be received directly from the antenna 24 through the data line 26, where the data line 26 is labeled in FIG. 1 as 'A'. Alternatively, in another approach, the RF signal may be received from the control module 30 (where the control module 30 may be, for example, a telematics control module) through the data line 26 labeled as 'B'.

In the exemplary embodiment as shown in FIG. 1, the antenna 24 is mounted on an external surface 42 of the vehicle 40. Specifically, FIG. 1 shows the antenna mounted to a roof 44 of the vehicle 40, however it is to be understood that the antenna 24 may be mounted along other external surfaces 42 of the vehicle 40 as well. Locating the antenna 24 on the roof 44 may provide a generally unobstructed line-of-sight, as well as a large conducting surface (e.g., the metal surface of the roof 44). The antenna 24 may be sized to send and receive RF signals of a particular frequency. For example, the antenna 24 may be sized to send and receive cellular telephone signals.

The control module 30 also receives RF signals from the antenna 24 though the data line 26. In one embodiment, the control module 30 may be a telematics control module. The transceiver 32 also receives RF signals from the antenna 24 though the data line 26. In one embodiment if the charging system 10 is employed in the vehicle 40, the battery 34 may be a vehicle battery (e.g., a lead-acid battery or a lithium ion battery for example) that provides power to the inductive charger 20.

Figure 2:
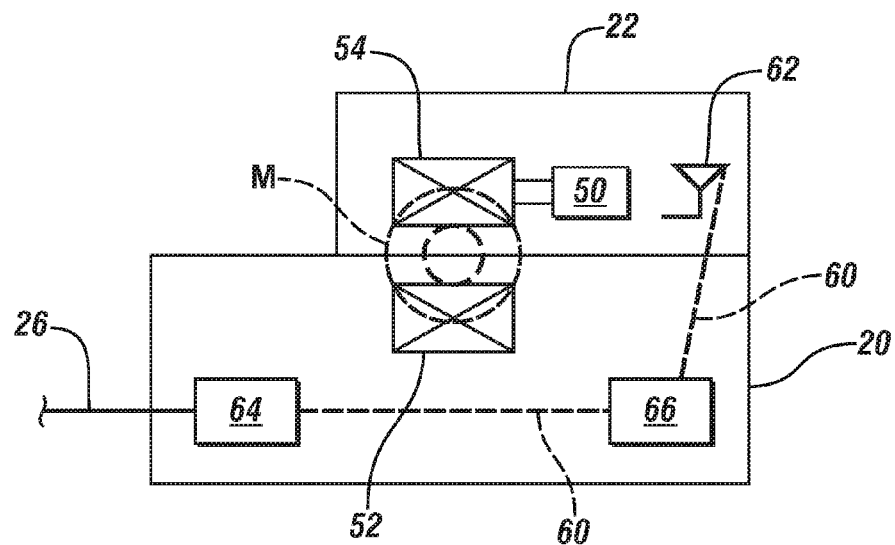
FIG. 2 is a schematic illustration of the charging system according to one embodiment of the application.

The portable electronic device 22 may be any type of portable electronic device that sends and receives RF signals such as, for example, cellular telephone signals. In one exemplary embodiment, the portable electronic device 22 may be a smartphone, or a cellular telephone. Turning now to FIG. 2, the portable electronic device 22 includes a rechargeable energy storage device such as a battery 50 THAT may be charged by the inductive charger 20. The inductive charger 20 includes a primary coil 52, and the portable electronic device 22 includes a secondary coil 54. As power is supplied to the inductive charger 20 (e.g., through the battery 34 shown in FIG. 1), current passes through the primary coil 52 to create a magnetic flux M. The portable electronic device 22 is placed in proximity to the primary coil 52 such that the magnetic flux M couples to the secondary coil 54 to induce current in the secondary coil 54. The secondary coil 54 is connected to the rechargeable battery 50, where the current induced in the secondary coil 54 provides charge to the rechargeable battery 50.

In addition to providing charge to the rechargeable battery 50, the inductive charger 20 also radiates an outgoing RF signal 60 to an antenna 62 of the portable electronic device 22. Specifically, the outgoing RF signal 60 is based on the incoming RF signal 28 (shown in FIG. 1) that is received from the data line 26. In the embodiment as shown in FIG. 2, the inductive charger 20 includes an RF coupling assembly 64 and an electric radiator 66. The RF coupling assembly 64 is configured for receiving the incoming RF signal 28 (shown in FIG. 1) from the data line 26 and radiating the outgoing RF signal 60 to the radiator 66. The radiator 66 radiates the outgoing RF signal 60 to the antenna 62 of the portable electronic device 22.

In one embodiment, the RF coupling assembly 64 may include, for example, a sampler circuit 70 (shown in FIG. 3) for receiving a waveform of the incoming RF signal 28 (FIG. 1) from the data line 26. The sampler circuit 70 matches the waveform of the incoming RF signal 28 to a waveform required by the outgoing RF signal 60. That is, the sampler circuit 70 matches the waveform from the incoming RF signal 28 to the waveform that is needed by the antenna 62 of the portable electronic device 22. In one embodiment, the sampler circuit 70 may be a linear matching network. The RF coupling assembly 64 also includes an antenna 72 (shown in FIG. 3). The antenna 72 is in communication with the sampler circuit 70, and transmits the outgoing RF signal 60 to the radiator 66. The antenna 72 may be a near field antenna, and the outgoing RF signal 60 may be a near field cellular RF signal.

Figure 4:
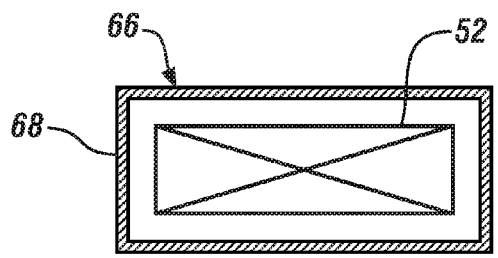
FIG. 4. is a schematic illustration of an alternative approach for providing a radiator as shown in FIG. 2.

The radiator 66 may be any type of electric radiator element that is configured for receiving and transmitting the outgoing RF signal 60. In one embodiment, the radiator 66 may be a passive element (e.g., the radiator does not require an external power source), which in turn may reduce the cost and complexity of the inductive charger 20. However, it is to be understood that the radiator 66 may be an active element as well. In one exemplary embodiment that is shown in FIG. 4, the radiator 66 may be a Faraday shield or cage that is placed or located over at least a portion of the primary coil 52 of the inductive charger 20. Specifically, a conducting element 68 of the Faraday cage may be modified in dimensions (e.g., the conducting element 68 dimensions may be increased or reduced in size) to radiate the outgoing RF signal 60.

Turning back to FIG. 2, the radiator 66 communicates the outgoing RF signal 60 to the antenna 62 of the portable electronic device 22. Specifically, for example, the outgoing RF signal 60 is a cellular signal (e.g., for example a near field cellular RF signal). Thus, the inductive charger 20 not only provides charge to the rechargeable battery 50, but also acts to re-radiate the cellular signal to the portable electronic device 22. Thus, the portable electronic device 22 may have improved or enhanced cellular reception. Specifically, for example, if the inductive charger 20 is placed within an interior cabin of the vehicle 40 (FIG. 1), some of the locations within the interior cabin may not provide adequate RF reception to the portable electronic device 22, resulting in dropped calls or relatively low data rates. However, the inductive charger 20 re-radiates the cellular signal to the portable electronic device 22, thereby providing improved cellular reception.

Figure 3:
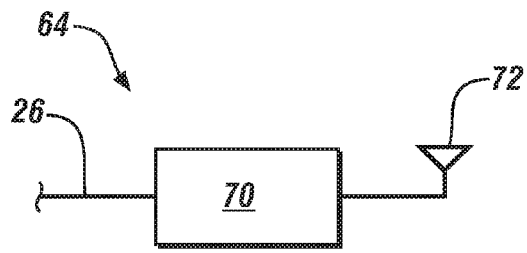
FIG. 3 is a schematic illustration of a radio frequency ("RF") coupling device shown in FIG. 2.
Figure 5:
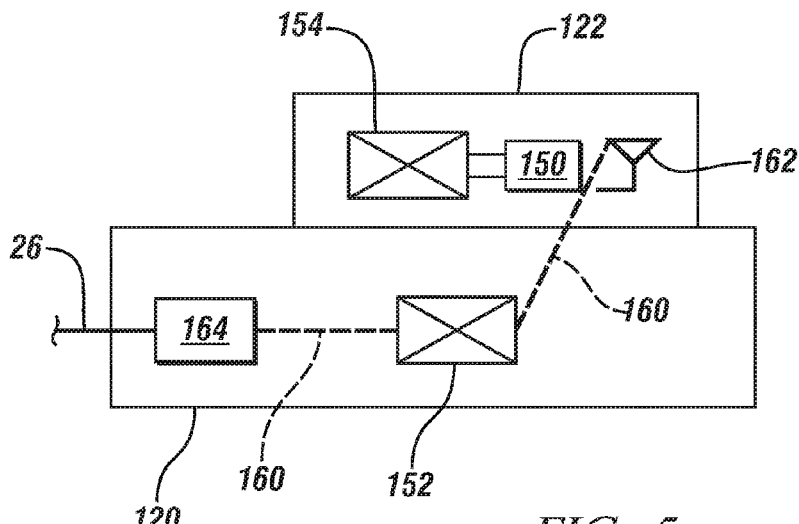
FIG. 5 is a schematic illustration of the charging system according to another embodiment of the application.

FIG. 5 is an alternative embodiment of an inductive charger 120 and a portable electronic device 122. In the embodiment as shown, the portable electronic device 122 includes a battery 150, a secondary coil 154, and an antenna 162. The inductive charger 120 includes a RF coupling assembly 164 and a primary coil 152. Similar to the illustration as shown in FIG. 3, the RF coupling assembly 164 may include the sampler circuit 70 for matching the waveform of the incoming RF signal 28 (FIG. 1) from the data line 26 to the waveform that is required by an outgoing RF signal 160. The RF coupling assembly 164 also includes the antenna 72 (shown in FIG. 3). The antenna 72 is in communication with the sampler circuit 70, and transmits the outgoing RF signal 160 to the primary coil 152.

Figure 6:
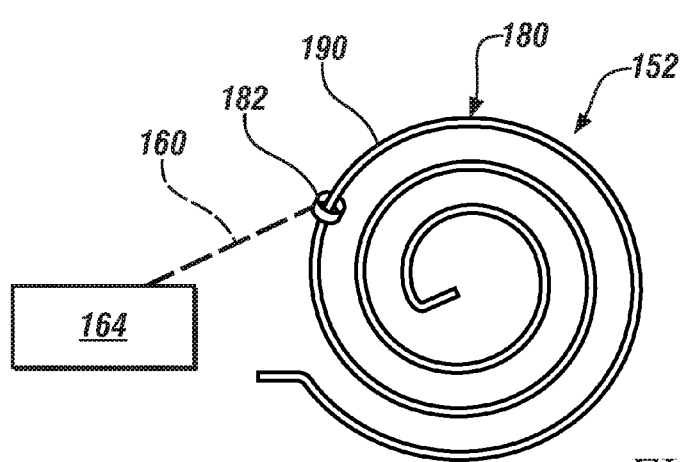
FIG. 6 is an illustration of a primary coil as shown in FIG. 5.

The primary coil 152 is configured to receive the outgoing RF signal 160 from the RF coupling assembly 164. Specifically, the primary coil 152 may include various features that provide RF functionality. For example, turning now to FIG. 6, an exemplary primary coil 152 is illustrated having an outer or exposed ring 180. A RF element 182 may be placed along the exposed ring 180, and generally acts as an appendage or extension of the primary coil 152, where the RF element 182 radiates the outgoing RF signal 160. In the example as shown in FIG. 6, the RF element 182 is a generally annular element that slides over an outer surface 190 of the exposed ring 180. The RF element 182 is configured for receiving the outgoing RF signal 160 from the RF coupling assembly 164, and transmitting the outgoing RF signal 160 to the antenna 162 of the portable electronic device 122 (shown in FIG. 5). The RF element 182 may be, for example, an antenna element that is sized to send and receive cellular signals. Specifically, in one embodiment, the RF element 182 may be an antenna that is sized to radiate near field cellular RF signals.

Thus, in the embodiment as shown in FIGS. 5-6, the primary coil 152 not only provides charge to the battery 150, but also acts as an RF radiator as well. Similar to the embodiment as shown in FIG. 2, the inductive charger 120 also acts to re-radiate the cellular signal to the portable electronic device 122. Thus, the portable electronic device 122 may have improved or enhanced cellular reception.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed:

1. An inductive charger for a portable electronic device, the portable electronic device having a radio frequency ("RF") antenna and a secondary coil, the RF antenna configured for receiving an outgoing RF signal, the inductive charger comprising:
   a primary coil configured for creating a magnetic flux, the magnetic flux configured for coupling to the secondary coil of the portable electronic device to induce current;
   a RF coupling assembly receiving an incoming RF signal and configured to radiate the outgoing RF signal, wherein the outgoing RF signal is based on the incoming RF signal; and
   a radiator configured to receive the outgoing RF signal from the RF coupling assembly, the radiator configured to radiate the outgoing RF signal to the RF antenna of the portable electronic device
   wherein the RF coupling assembly includes a sampler circuit and an antenna, the antenna is an communication with the sampler circuit to transmit the outgoing RF singal to the radiator, and the antenna is a near field antenna and the outgoing RF signal is a near field cellular RF signal.

2. The inductive charger as recited in claim 1, wherein the RF coupling assembly is in communication with a data transmission line to receive the incoming RF signal.

3. The inductive charger as recited in claim 2, wherein the data transmission line is in communication with a vehicle antenna that receives the incoming RF signal.

4. The inductive charger as recited in claim 2, wherein the data transmission line is in communication with a vehicle control module.

5. The inductive charger as recited in claim 2, wherein the data transmision line is a coax cable.

6. The inductive charger as recited in claim 1, wherein the radiator is a passive radiation device.

7. The inductive charger as recited in claim 1, wherein the radiator is a Faraday shield that is located over at least a portion of the primary coil of the inductive charger.

8. The inductive charger as recited in claim 1, wherein the incoming RF signal and the outgoing RF signal are both cellular signals.

9. The inductive charger as recited in claim 1, wherein the portable electronic device is one of a smartphone and a cellular telephone.

10. An inductive charger for a portable electronic device, the portable electronic device having an a radio frequency ("RF") antenna and a secondary coil, the RF antenna configured for receiving an outgoing RF signal, the inductive charger comprising:
    a primary coil configured for creating a magnetic flux, the magnetic flux configured for coupling to a secondary coil in the portable electronic device to induce current;
    a RF coupling assembly receiving an incoming RF signal and configured to radiate the outgoing RF signal, wherein the outgoing RF signal is based on the incoming RF signal; and
    a RF element that is placed along the primary coil, the RF element configured for receiving the outgoing RF signal from the RF coupling assembly and transmitting the outgoing RF signal to the RF antenna of the portable electronic device
    wherein the RF coupling assembly includes a sampler circuit and an antenna, the antenna is an communication with the sampler circuit to transmit the outgoing RF signal to the radiator, and the antenna is a near field antenna and the outgoing RF signal is a near field cellular RF signal.

11. The inductive charger as recited in claim 10, wherein the RF element is an antenna element configured for radiating a near field cellular RF signal.

12. The inductive charger as recited in claim 10, wherein the primary coil includes an outer coil, and the RF element is placed along the outer coil.

13. The inductive charger as recited in claim 10, wherein the RF coupling assembly is in communication with a data transmission line to receive the incoming RF signal.

14. The inductive charger as recited in claim 13, wherein the data transmission line is in communication with a vehicle antenna that receives the incoming RF signal.

15. The inductive charger as recited in claim 13, wherein the data transmission line is in communication with a vehicle control module.

16. The inductive charger as recited in claim 10, wherein the portable electronic device is one of a smartphone and a cellular telephone.

* * * * *